Aug. 16, 1938.  A. D. SNYDER  2,127,436
ROTARY VALVE AND INTERNAL COMBUSTION ENGINE CONSTRUCTION
Filed June 28, 1935  2 Sheets-Sheet 1
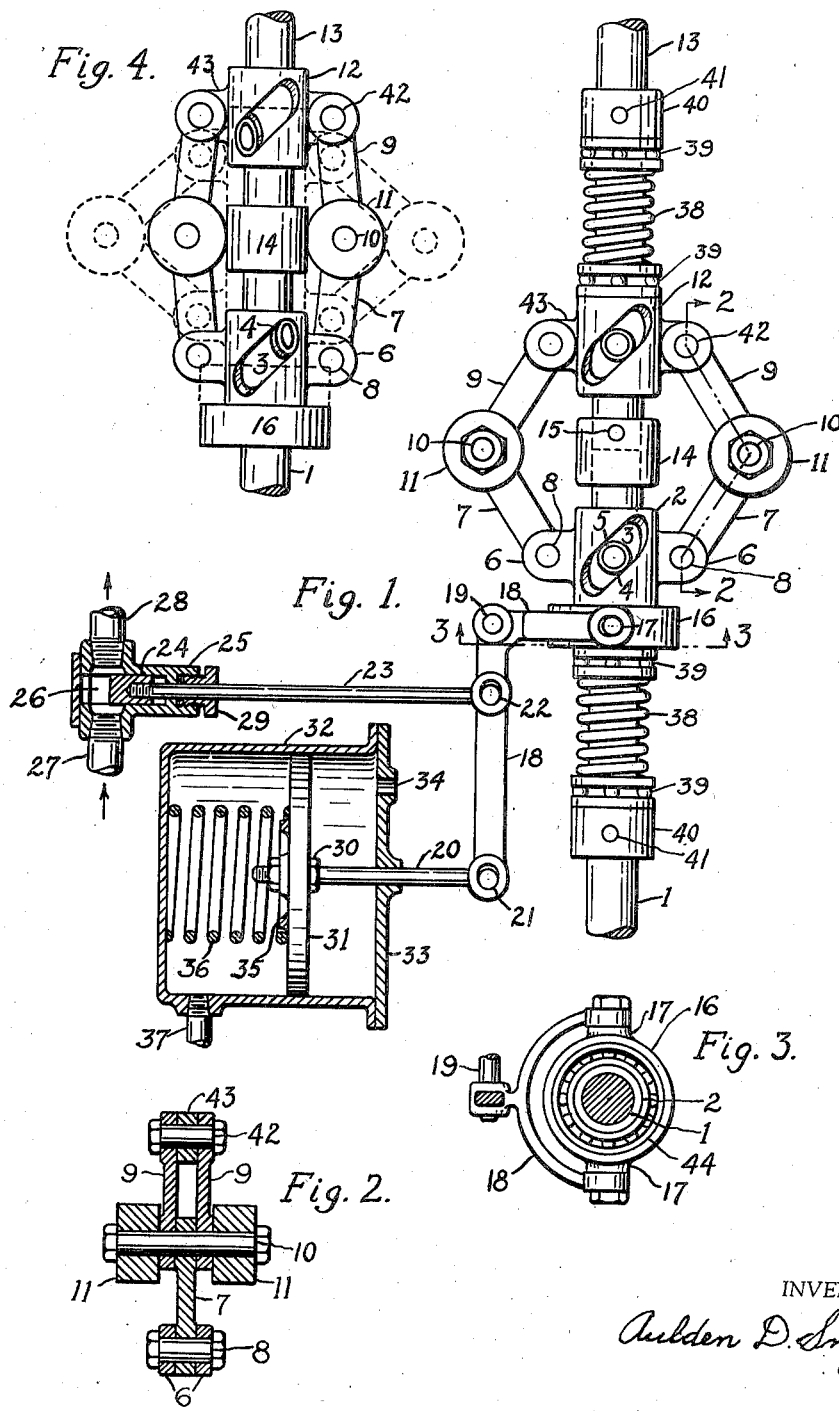
INVENTOR.
Aulden D. Snyder Aug. 16, 1938.  A. D. SNYDER  2,127,436
ROTARY VALVE AND INTERNAL COMBUSTION ENGINE CONSTRUCTION
Filed June 28, 1935  2 Sheets-Sheet 2

INVENTOR.
Aulden D. Snyder.

Patented Aug. 16, 1938

2,127,436

UNITED STATES PATENT OFFICE

2,127,436

ROTARY VALVE AND INTERNAL COMBUSTION ENGINE CONSTRUCTION

Aulden D. Snyder, Cleveland, Ohio, assignor of one-third to William J. Wesseler, Cleveland, Ohio Application June 28, 1935, Serial No. 28,896

9 Claims. (Cl. 123—99)

This invention, as indicated, relates to an improvement in rotary valve and internal combustion engine construction set forth in United States Patent No. 1,883,038 dated October 18, 1932, and a co-pending application, Serial No. 26,429, dated June 13, 1935, pertaining to an improvement in rotary valve and internal combustion engine construction and lubrication.

One of the principal objects of my invention is to provide an automatic means for control of engine valve timing in accordance with engine speed and engine load.

Another object of my invention is to provide a means for control of lubrication supplied to the valve mechanism and other operative parts of an internal combustion engine in relation to engine speed and engine load.

A further object of my invention is to provide a combined automatic means for control of ignition and valve timing in accordance with certain desired resultant effects of engine speed and engine load. Another object of my invention is to provide a combined automatic means for control of ignition timing, valve timing, oil pressure and oil flow in relation to engine speed and engine intake manifold vacuum conditions.

While the accompanying drawings serve to illustrate certain mechanism embodying my invention, such disclosed means constitutes but one of the various mechanical forms in which the principle of my invention may be used. In said annexed drawings:—

Figure 5:
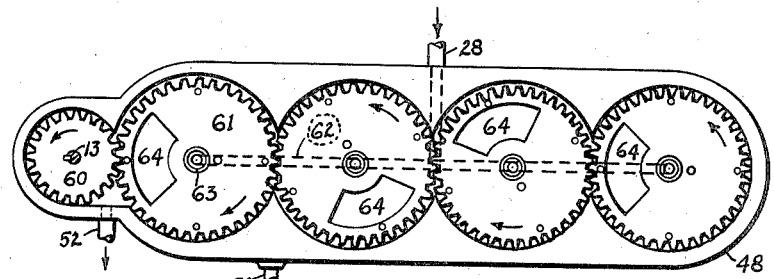
Figure 6:
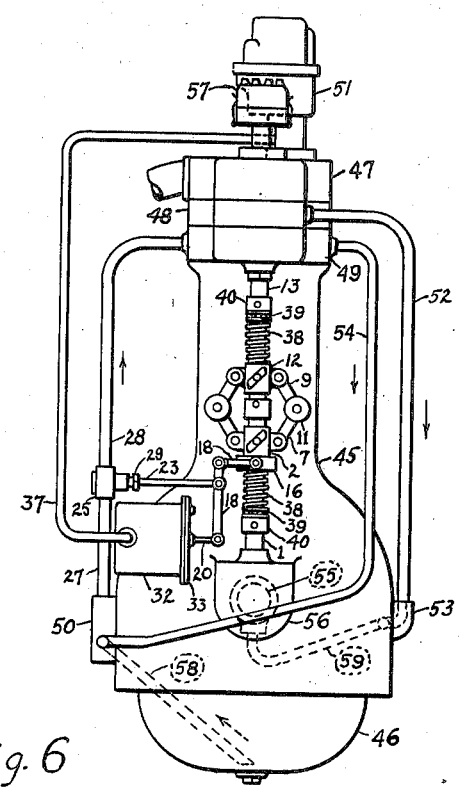

Figure 1 is a front elevation, partly in section, of the mechanism embodying the principles of my invention; Figure 2 is a sectional view taken along the line 2—2 of Figure 1, of the centrifugally operated arms and weights of the mechanism controlled by engine speed; Figure 3 is a view, partially in section, taken along the line 3—3 of Figure 1, showing the mechanism for transmitting the movement of the vacuum controlled mechanism to the speed controlled mechanism; Figure 4 is a front elevation of the combined speed and vacuum controlled mechanism, the full lines of which indicate the relative positions of the component parts during starting of engine, and the broken lines of which indicate the position at full advance corresponding to high engine speed and high load conditions; Figure 5 is a plan view of an articulated disc gear valve mechanism as viewed with the upper cylinder head section removed, showing a type of valve which is suited to my controlling and driving mechanism; and Figure 6 is a front elevation of an internal combustion engine equipped with the mechanism embodying the principles of my invention. Similar numerals are used to refer to similar or the same parts thruout the various views.

Referring to Figure 1 of said annexed drawings, lower portion 1 of the vertical valve and ignition drive shaft, is driven by geared connections to the crankshaft of the internal combustion engine; or, if this were adapted to a poppet type valve, portion 1 would represent the portion of the cam shaft driven by the timing gears of a standard internal combustion engine. A lower slideable cam sleeve 2, has a cam slot 3 which engages over a cam roller 4 on projecting transverse pin 5, fixed in said portion 1 of the drive shaft. Said lower cam sleeve 2 has drilled projecting lugs 6 to which are attached pivotal governor arms 7 by transverse bearing pivot pins 8. Said lower set of governor arms 7, are interconnected in pivotal relation with upper set of governor arms 9, by transverse bearing pivots 10, on which are mounted weights 11. An upper slideable cam sleeve 12 is mounted in similar manner to lower cam sleeve, engaging cam roller on transverse pin fixed in upper portion 13 of said vertical drive shaft, said upper portion representing the driven portion of the automatic control mechanism. Said upper and lower portions of the vertical valve and ignition drive shaft are held in end-to-end relation and axial alignment by common bearing 14 pinned to upper portion 13 of drive shaft, by taper pin 15.

At lower end of lower cam sleeve 2, is fitted a ball bearing encircled by a tight fitting collar 16. Said collar has bearing pin projections 17 engaging with slotted bearing in yoked upper end of angular crank arm 18. Said arm 18 pivots about fixed center 19, and is actuated at its lower end thru vacuum cylinder piston rod 20, connecting thru piston rod bearing pin 21, engaging slotted bearing in lower end of crank arm 18. On lower arm of angular crank 18, is bearing pin 22 engaging an elongated bearing in end of valve control rod 23. Other end of said valve control rod connects to sliding valve 24 in valve housing 25.

Said sliding valve is such as to provide a bypass of lubricating oil thru chamber 26 when it has reached the limitation of its travel toward its closed position. The relation of said sliding valve to said chamber opening is thus controlled in accordance with the controlled movement of lower slideable cam sleeve 2. An oil pressure feed line 27 brings lubricant under pressure from the discharge side of a pressure lubricant pump, passes the lubricant thru chamber 26 in accordance with opening of valve 24, and thence thru outlet 28 which leads to the working parts of the internal combustion engine. In valve housing 25 is packing nut 29 sealing valve rod 23 against leakage of lubricant.

Piston end of piston rod 20 is threaded to receive locking nuts 30, holding piston 31 firmly to said rod, and affording adjustment of position of piston on said rod. Vacuum cylinder 32 has cover 33 with atmospheric vent 34 on piston rod side of said piston. Piston head has annular raised rim 35 concentric with said piston rod axis, and said rim has an outside diameter slightly less than the inside diameter of vacuum equalizing spring 36. Said spring bears against said piston head at one end, and against the bottom of the vacuum cylinder at opposite end. Vacuum connection 37 connects to line leading to intake manifold of the internal combustion engine. The partial vacuum created by piston suction within the engine, varies with engine load, and accordingly increases or decreases the effective vacuum within said cylinder 32.

As the engine vacuum increases, the spring 36 is compressed due to the differential between atmospheric pressure on piston rod side of said vacuum piston, and vacuum on piston head side of said piston. As vacuum decreases with increased engine load, said spring 36 acts to return said piston 31 toward the vented end of said vacuum cylinder 32. Area of piston 31 and load of spring 36 are proportioned to available vacuum and requisite force for actuating the linkage which controls said oil volume and pressure control valve 24 in pressure lubricant feed line 27, as well as the actuation of said lower cam sleeve 2 on the automatic control mechanism.

Torque balancing and equalizing springs 38 around said upper and lower portions of said valve and ignition driving shaft, have ball thrust bearings 39 at each end. Shaft collars 40 are pinned to respective shaft sections 1 and 13 by taper pins 41. Said shaft collars are placed so as to pre-load said torque equalizing springs in accordance with the valve mechanism torque, thus allowing the governor mechanism to act freely in relation to engine speed and vacuum conditions. Thus it will be readily understood that oil volume and pressure, valve timing and ignition timing are controlled simultaneously in relation to the resultant of the forces created by the vacuum cylinder and the weighted governor, and said forces are proportionate to engine load and engine speed respectively.

Consequently, oil flow is reduced at high-speed light-load conditions and increased under heavy load conditions, as compared to current practice. This is conducive to better oil economy, since oil consumption in an internal combustion engine is greatest at high speeds with present practice, due to the absence of positive means for control of oil flow and oil pressure. The operating characteristics of an engine embodying the features of my invention are such as to provide greater flexibility, greater load capacity, faster acceleration and better economy. Furthermore, with this invention it is no longer necessary to compromise the valve and ignition timing, for its use provides automatic timing of these factors in relation to engine speed and engine load.

In Figure 2 of said annexed drawings, lower governor arm 7 connects in pivotal relation to said lower cam sleeve by transverse bearing pivot 8 in drilled lugs 6. Other end of said governor arm connects in pivotal relation to upper set of governor arms 9 thru transverse bearing pivot 10. On said pivot 10 are mounted weights 11. Upper governor arms 9 connect to said upper slideable cam sleeve in pivotal relation by means of transverse bearing pin 42 anchored in lug 43 of said upper cam sleeve.

In Figure 3 of said annexed drawings, lower section 1 of vertical valve and ignition driving shaft is fitted with slideable lower cam sleeve 2. Said lower cam sleeve is provided with a shouldered extension onto which is pressed the inner race of ball bearing 44 about the outer race of which is shrunk collar 16 with bearing pin projections 17 engaging bearings in yoke of angular crank arm 18. Said crank arm 18 pivots about fixed pivot center bearing 19.

In Figure 4 of said annexed drawings, the full lines show the relative positions of said upper and lower slideable cam sleeves, governor arms and weights, at the moment the engine is being started. This represents maximum valve torque condition, and is almost immediately rectified by said torque equalizer springs, as shown in Figure 1 of the drawings. The broken lines of Figure 4 represent the relative positions of the component parts of the governor mechanism corresponding to a high-speed high-load condition, or extreme high-speed condition, during which the force created by the centrifugally actuated governor weights 11 is the greatest.

In Figure 5 of said annexed drawings, upper section 13 of the vertical valve and ignition distributor driving shaft is keyed to valve driving pinion 60. Said driving pinion drives the articulated disc gear valves at one-half crankshaft speed. Said valves rotate about hollow pivot pins 63, and ports 64 serve to open and close segmental port openings in the cylinder head to permit inflow and outflow of gases from the combustion chambers of respective cylinders. Oil pressure line 28 carries lubricant thru a passageway in the cylinder head to longitudinal passageway 62, and thence thru hollow pivot pins 63 to the wiping surfaces of said valves. Filler piece 48 conforms in contour to the peripheries of the gear teeth of said valves and has greater clearance around certain of said valves so that the major portion of the lubricant is caused to accumulate and flow to the discharge line 52. Certain other portion of said lubricant is withdrawn from the vicinities of the port openings in the cylinder head thru suction line 54. These features of articulated disc gear valve design and lubrication are explained in greater detail in my co-pending application Serial No. 26,429, dated June 13, 1935.

In Figure 6 of said annexed drawings, 45 is the combined cylinder block and crankcase of an internal combustion engine. On the bottom of said crankcase is oil sump 46. On the top of said cylinder block is lower cylinder head section 49, filler piece section 48 and upper section 47. Mounted on said upper head section is carburetor 51 and ignition distributor head 57. At the forward end of the crankshaft 55 of said engine is bevel gear housing 56 containing the gears for driving lower section 1 of the vertical valve and ignition distributor drive shaft. Said lower drive shaft section 1 is interconnected with said upper section 13 by means of the central mechanism for varying the angular relation of the respective drive shaft sections in accordance with engine speed and engine load. The upper section 13 of the vertical drive shaft extends thru head sections 49, 48 and 47 to drive the ignition distributor cam thru small reducing spur gears contained in the base of said distributor 57. The vacuum cylinder 32 is connected thru line 37 to the base of said carburetor 51 which connects with the intake manifold contained in the upper cylinder head section 47 of said engine. A suction and pressure pump 50 draws oil from sump 46 thru intake pipe 58 and feeds it under pressure thru line 27 in accordance with the opening of control valve 25, into the line 28 and thence to the valve mechanism. The dicharged pressure lubricant passes thru line 52 into oil cooler and distributor 53 and thence to the main crankshaft bearings and other internal working parts of said engine thru line 59. Suction line 54 withdraws a certain portion of the lubricant from the vicinities of the valve ports in the lower head section 49 and it passes thru the pump 50 and is recirculated. Said suction line 54 and pressure line 52 may be fitted with oil filters.

From Figure 6 it will be apparent that the valve timing, ignition timing and oil flow are controlled simultaneously in accordance with certain effects of engine speed and engine load.

The method of simultaneously controlling valve and ignition timing with oil feed volume and pressure has been shown in the annexed drawings as it would be applied to a rotary valve design, since it is admirably suited to such design; but, nevertheless, it is obvious that this principle could be applied equally well to other valve types, such as the poppet valve with cam action, without departing from the spirit of my invention. Likewise, the method of controling oil volume and pressure could be readily adapted to engines in current use, and especially to engines with automatically controlled ignition timing in relation to engine speed and engine load.

It is likewise obvious that the valve timing could be controlled in relation to engine load alone, by using a slideable cam sleeve similar to that shown in my Patent No. 1,883,038, interconnected thru linkage with the vacuum cylinder. It is also obvious that where mechanical linkage is shown in the annexed drawings, other forms of linkage, such as electrical linkage, could be used without departing from the spirit of my invention.

To sum up briefly the salient advantages of my invention, it may be said that it provides for maximum internal combustion engine flexibility, maximum fuel and oil economy, and maximum desirable performance characteristics.

Other modes of applying the principle of my invention may be employed instead of the one explained, change being made as regards the mechanism herein disclosed, providing the means stated by any of the following claims or the equivalent of such stated means be employed.

I therefore particularly point out and distinctly claim as my invention:—

1. In an internal combustion engine, means for automatic control of the valve and ignition timing in relation to combined engine speed and load characteristics, consisting of interconnected means for driving the valve and ignition timing mechanism, such means embodying a torque balanced and equalized element responsive to rotational speed of said driving means, and a pressure balanced and equalized element responsive to pressure in the intake manifold, said respective means interacting to produce a resultant control factor of said apparatus based on speed and load characteristics.

2. In an internal combustion engine, automatic control mechanism for simultaneously controlling the timing of valves for admission and exhaust of cylinder gases, ignition timing, and lubricant flow, consisting of interconnected means for driving the valve and ignition timing mechanism from the crank shaft of said engine, such means embodying a torque balanced and equalized element responsive to rotational speed of said driving means, and a pressure balanced and equalized element responsive to low pressure in the intake manifold, and means connected to said speed and load responsive mechanism for driving in variable rotational angular relation the valve timing and ignition timing mechanism, qualified by the load characteristics of the element responsive to low pressure.

3. A means for automatically controlling and varying the valve and ignition timing of an internal combustion engine with respect to the crank shaft speed and the flow of lubricant, embodying a torque balanced and equalized element responsive to rotational speed of a driven member associated with said crank shaft, combined with a pressure balanced and equalized element responsive to low pressure in the intake manifold of said engine, so as to alter said valve and ignition timing in relation to the operating speed and imposed load on said engine.

4. In an internal combustion engine the combination of an automatic means for positively correlating ignition and valve timing over the full range of engine operation, which comprises a pivoted lever interconnected with movable elements angularly displaceable with reference to each other to operate and control valve and ignition units, and speed responsive means and pressure responsive means acting upon said lever and controlling the angular relation of said movable elements, and positively reacting upon each other at all times.

5. In an internal combustion engine the combination of automatic means for positively correlating the control of ignition and valve timing over the full range of engine operation, which comprises an articulated control unit having a pivoted lever interconnected with movable elements angularly displaceable with reference to each other, to operate and control the said valve and ignition units, and speed responsive means and pressure responsive means acting upon said lever and controlling the angular relation of said movable elements and positively reacting upon each other, and movable elements for lubrication control for said engine connected with said speed responsive and pressure responsive means at a predetermined ratio.

6. In an internal combustion engine the combination of an automatic means for positively correlating the control of ignition, valve timing, and lubrication units over the full range of engine operation, which comprises a pivoted lever interconnected with movable elements operating to control respectively said valve and ignition timing, and lubrication units, and speed responsive and pressure responsive means acting upon said lever and controlling the relative position of said movable elements, and positively reacting upon each other at all times.

7. In an internal combustion engine, a combinative means for automatic control of the valve and ignition timing in relation to combined engine speed and load characteristics, consisting of a sectional valve and ignition distributor driving shaft the sections of which are axially aligned and interconnected by a spring-balanced centrifugally actuated governor mechanism which varies the rotational angular relation of said valve driving shaft sections, and interconnected with a spring-balanced vacuum cylinder piston actuated by the intake manifold vacuum of said engine, to qualify the effect of said governor mechanism in relation to the load conditions imposed on said engine.

8. An automatic control mechanism for simultaneous control of timing of valves for admission and exhaust of cylinder gases, ignition timing and lubricant flow, embodying a sectional drive shaft for the valve mechanism of an internal combustion engine, one section of which being driven by the crankshaft of said engine, and the other section being driven in variable rotational angular relation to said driven section by means of an interconnecting spring-loaded and centrifugally actuated governor mechanism, qualified by a spring-loaded and vacuum actuated piston within a vacuum cylinder and connecting linkage.

9. A means for automatically controlling and varying the valve and ignition timing of an internal combustion engine with respect to the crankshaft and the flow of lubricant, embodying a spring-balanced and weighted governor actuated by centrifugal force, combined with a spring-loaded vacuum cylinder piston actuated by partial vacuum of intake manifold of said engine, so as to alter said valve and ignition timing and lubricant flow in certain relation to the operating speed and imposed load of said engine.

AULDEN D. SNYDER.